(No Model.)

I. A. EKSTROM.
COMBINED TRUCK AND BARREL HOISTER.

No. 423,227. Patented Mar. 11, 1890.

Witnesses.
J. Jessen
B. Brooh

Inventor.
Israel A. Ekstrom,
By Paul Merwin attys

N. PETERS, Photo-Lithographer, Washington, D. C.

UNITED STATES PATENT OFFICE.

ISRAEL A. EKSTROM, OF LONG LAKE, MINNESOTA.

COMBINED TRUCK AND BARREL HOISTER.

SPECIFICATION forming part of Letters Patent No. 423,227, dated March 11, 1890.

Application filed July 18, 1889. Serial No. 317,877. (No model.)

*To all whom it may concern:*

Be it known that I, ISRAEL A. EKSTROM, of Long Lake, in the county of Hennepin and State of Minnesota, have invented a certain Improved Combined Truck and Barrel Hoister, of which the following is a specification.

My invention relates to improvements in ordinary hand-trucks, by means of which a barrel or other similar load may be transported from place to place and elevated to a raised support by simply tilting the truck forward; and it consists, generally, in the construction and combination hereinafter described, and particularly pointed out in the claims.

Figure 1:
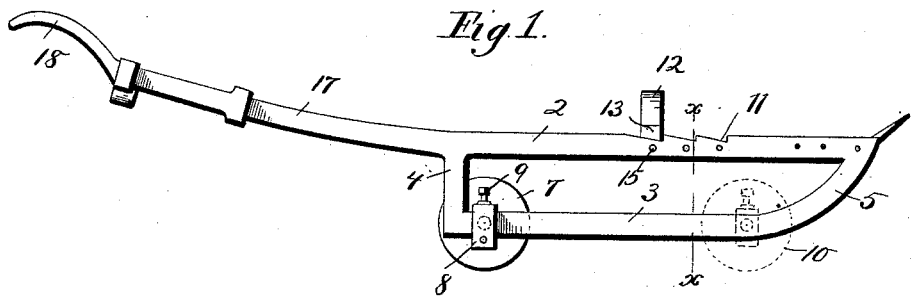
Figure 2:
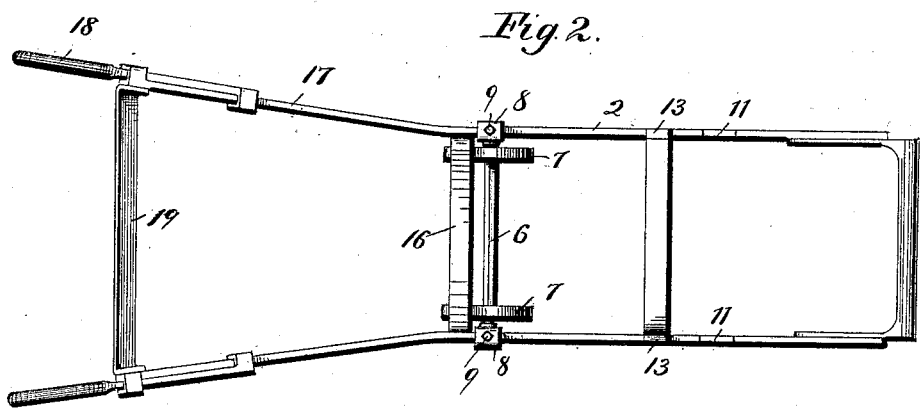
Figure 3:
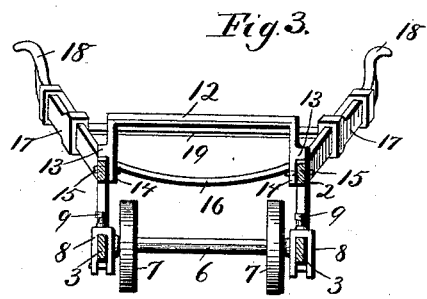

In the accompanying drawings, forming a part of this specification, Figure 1 is a side elevation of my combined truck and barrel hoister; Fig. 2, a plan view; and Fig. 3 is a cross-section of the same on line *x x* of Fig. 1.

In the drawings, 2 represents the main frame of the truck, constructed, preferably, of iron.

3 is a secondary or depending frame underneath the frame 2, to which it is secured at the standards 4 in the rear and at the forward end by giving the side bars an upward bend 5, like a sled-runner, and riveting or bolting them to the frame 2 or forming it integral with said frame 2.

The axle 6 of the truck-wheels 7 is adjustably secured to the frame 3 by means of suitable sliding sleeves or collars 8, embracing the side bars of the frame 3 and secured in any desired position thereto by means of the set-screws 9.

When the device is used as an ordinary truck, the axle 6 is moved forward and secured in the position shown by the dotted lines 10 at the forward end of the truck, whereby it is adapted to be used in the ordinary manner.

The upper surfaces of the side bars of the frame 2 are provided with the notches 11, and the upwardly-extending U-shaped adjustable cross-piece or support 12, having the lugs or projections 13, adapted to engage with said notches 11, is adjustably secured to the frame 2 in any desired position, the depending ends 14 of the support sliding inside of the side bars of the frame and the pins 15 being inserted into holes in the frame and the support 12, so as to secure it in any position desired, the lugs 13 affording a strong support upon the frame. This cross-bar 12 is arranged upon the frame at a distance from the forward end of the truck equal to the height to which it is desired to raise the barrel or other load.

The wheels of the truck are secured in the position shown by the full lines in Fig. 1 when the truck is used as a barrel-hoister. The cross-bar 16 is preferably bent downward, as shown in Fig. 3, so as to form a saddle conforming to the shape of a barrel. The handle-extensions 17 of the truck-frame are preferably bent outward slightly and provided with suitable handles 18, which may be arranged, as shown in the drawings, as separate pieces slidably secured to the bars 17, whereby the same can be drawn out to lengthen the handles for the more convenient handling of the truck when loaded. The cross-bar 19, connecting the outer ends of the bars 17, is preferably a flat bar depending from the handles, so that when resting upon the floor the handles 18 will be above the floor a convenient distance.

Operation: When used as an ordinary truck, the wheels are set at the forward end of the truck, and, if desired, the support 12 can be removed, so as to be out of the way of articles loaded upon it, and used the same as the ordinary form. When used as a combined truck and barrel hoister, the wheels are set in the position shown in Fig. 2. The support 12 is set on the frame at the distance from the front end of truck equal to the height desired to raise the load. The handle end of the truck is then lowered and the cross-piece 19 inserted underneath the barrel, which is then tilted forward and is supported upon the cross-piece 16 and with the end bearing against the support 12. By raising the handles the truck is then rolled to any desired point and tilted forward upon its front end, thus discharging the load upon the shelf or other support.

I claim—

1. The combination, with a truck, of an adjustable support arranged transversely of the frame of the truck and carrying wheels adjustably secured underneath said truck-frame, substantially as and for the purposes set forth.

2. The combination, with a truck provided with notches on the upper face of the side bars thereof, an upwardly-extending support arranged transversely of said frame and adjustably secured in said notches, a depending wheel-supporting frame underneath said truck-frame and rigidly secured thereto, and a pair of truck-wheels slidably secured upon said depending frame longitudinally thereof, substantially as and for the purposes set forth.

3. The combination, with the truck-frame 2, of the U-shaped support 12, arranged transversely thereof and adjustably secured thereto, the depending frame 3, rigidly secured to said frame 2, the axle 6, having the wheel 7 and arranged transversely of the frame 3, adjustable longitudinally thereof, the depending cross-piece 19, arranged between the handles of said truck, and the extension-handles 18, substantially as and for the purposes set forth.

In testimony whereof I have hereunto set my hand this 8th day of July, 1889.

ISRAEL A. EKSTROM.

In presence of—
T. D. MERWIN,
BESSIE BOOTH.